United States Patent [19]

Tamura et al.

[11] 4,256,812
[45] Mar. 17, 1981

[54] SEALED TYPE BATTERY

[75] Inventors: Kazuhiro Tamura; Saburo Ninomiya, both of Takatsuki, Japan

[73] Assignee: Yuasa Battery Company Limited, Takatsuki, Japan

[21] Appl. No.: 87,774

[22] Filed: Oct. 24, 1979

[30] Foreign Application Priority Data

May 31, 1979 [JP] Japan .................. 54-74292[U]

[51] Int. Cl.³ .................................... H01M 2/12
[52] U.S. Cl. .................................................... 429/56
[58] Field of Search .................... 429/56, 53, 54, 57, 429/162, 72, 82; 220/89 A

[56] References Cited

U.S. PATENT DOCUMENTS

| | | | |
|---|---|---|---|
| 2,525,436 | 10/1950 | Williams, Jr. | 429/56 |
| 3,204,156 | 8/1965 | Moresi, Jr. et al. | 429/82 X |
| 3,262,819 | 7/1966 | Belove | 429/56 |
| 4,056,659 | 11/1977 | Spanur et al. | 429/54 |
| 4,175,166 | 11/1979 | Rosansky | 429/56 |

*Primary Examiner*—Anthony Skapars
*Attorney, Agent, or Firm*—Watson, Cole, Grindle & Watson

[57] ABSTRACT

According to the present invention, in a battery can forming a container or cover of a sealed type battery, a cruciform incision is made on a metal plate forming the battery can. Said incision being V-shaped in cross-section and the cruciform intersection point being constructed to present an X-shaped, wedge-shaped tip as seen in the view plan forming a thin part in the metal plate so that, when the internal pressure of the battery becomes abnormally high, before the sealed part is opened, by the pressure the thin part may tear and open to let the abnormal pressure escape and prevent the explosion and bursting of the battery.

By such construction, the fluctuation of the pressure resisting the tearing and opening of the above mentioned thin part can be reduced and a safe and positive operation can be made.

2 Claims, 4 Drawing Figures

SEALED TYPE BATTERY

BACKGROUND OF THE INVENTION

1. Field of the Invention

This invention relates to a safe and explosion preventing sealed type battery.

2. Description of the Prior Art

Generally, in sealed type batteries such as alkaline storage batteries, when the battery is overcharged or overdischarged, an excess gases exceeding the capacity of the electrode body for absorbing the gas will be generated from time to time. When this pressure within the battery becomes higher than the limited resisting pressure of the battery sealed part, an explosion accident will often occur and will damage the instrument being used. Therefore, various contrivances have been suggested whereby, when the internal pressure of the battery becomes higher than the limited resisting pressure, this internal pressure will be alllowed to escape to prevent the explosion of the battery. For example, as represented by U.S. Pat. No. 3,262,819, there is a method wherein a film is provided within a battery so that, when the internal pressure rises abnormally, the film will expand and is broken by a thrusting blade located outside the film and the internal gas may escape through there. In this method, a comparatively large space is required to within the battery and the component parts are many. It is also suggested to form a cruciform stamp on a battery can so that, when the internal pressure rises abnormally, the can may tear open. However, in fact, there have been many difficulties with such prior art devices.

SUMMARY OF THE INVENTION

The present invention has as an object to provide a sealed type battery which is simple in structure, positively tears and opens above the limited resisting pressure and is of a safe and explosion preventing structure.

Further objects, advantages and features of the present invention will become more fully apparent from a detailed consideration of the arrangement and construction of the constituent parts as set forth in the following specification taken together with the accompanying drawings.

DETAILED DESCRIPTION OF PREFERRED EMBODIMENTS

Figure 1A:
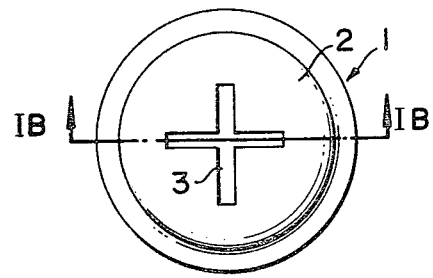
FIG. 1A is a plan view of a suggested conventional type battery can and FIG. 1B is a sectioned view on line IB—IB of FIG. 1A.
Figure 1B:
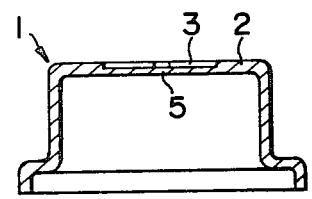

A battery can of a previously suggested sealed type battery is shown in FIG. 1 in which a cruciform stamp is made on a metal plate 2 forming a battery can 1. The resisting pressure of the stamped part is made lower than the resisting pressure of the sealed part (sealed part fastened and sealed through a packing of the battery can) so that the gas under an abnormal internal pressure may tear and open the stamped part to discharge the excess gas. There has been a suggestion that, if the resisting pressure of the above mentioned stamped part is made lower than the resisting pressure of the sealed part, the gas under the abnormal internal pressure will tear and open the stamped part to discharge the excess gas. However, it has been found by experiments made by the present inventors that, in fact, it is difficult to appropriately control the tearing and opening through the provision only of such cruciform stamp. For example, in a sealed type alkaline button battery, in order also to prevent the electrolyte from leaking out, the resisting pressure of the sealed part is required to be 60 to 70 $kg/cm^2$ but the surface of the thin part made by the simple cruciform stamp is flat, and even in the case where the thickness is made 1/9 of the thickness of the metal plate, the resisting pressure of the sealed part will fluctuate in a range of 40 to 80 $kg/cm^2$ and, when it is 80 $kg/cm^2$, the resisting pressure of the sealed part will be so low that the sealed part will burst first as a result. That is to say, it is necessary to make the resisting pressure of the stamped part always lower than the resisting pressure of the sealed part. Therefore, even in case the thickness of the stamped thin part is made 1/10 of the thickness of the metal plate, the resisting pressure of that part will fluctuate in a range of 10 to 60 $kg/cm^2$ and the resisting pressure of 10 $kg/cm^2$ will be so low that, even under a low pressure which can not be said to be abnormal, the stamped thin part will burst and open and will have no ability to function as a safety device. Further, stamped to provide the thin part with an intermediate dimension of 1/9 to 1/10 are not constant in precision, so far as the pressing work is concerned, are difficult to work and have not been practical.

The present invention is characterized in that, in view of the above mentioned viewpoints, a cruciform incision is made on a metal plate forming a battery can, each component incision of said cruciform shape being V-shaped in cross-section, and the cruciform intersection of the respective component incisions being formed to present a wedge-shaped tip which is X-shaped, all as can be seen in the plan view to thereby form a thin part in the metal plate that has a thickness which are ⅛ to 1/6 of the thickness of the metal plate.

Figure 2A:
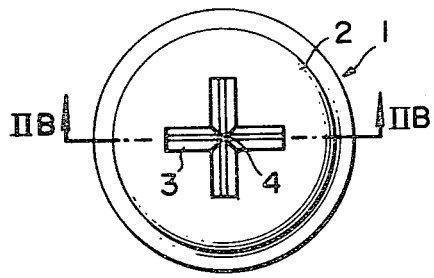
FIG. 2A is a plan view of a battery can of an embodiment used in the present invention and FIG. 2B is a sectioned view on line IIB—IIB of FIG. 2A.
Figure 2B:
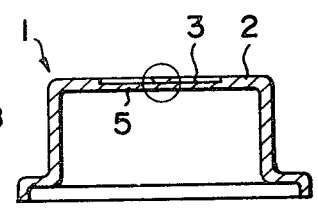

That is to say, as shown in FIG. 2, a cruciform incision 3 is made on the outer surface of a metal plate 2 forming a battery can. This incision 3 is V-shaped in cross-section. The tips of the respective component incisions of the cruciform incision intersect at a point 4 to form a an X-shaped, wedge-shaped tip at the point of intersection as seen in the plan view. Particularly, the thickness of the thin part 5 at this intersection is ⅛ to 1/6 of the thickness of the metal plate.

The relationship between the thickness and resisting pressure of the thin part according an embodiment is shown as in Table 1.

TABLE 1

| Thickness of the thin part (in ratio) | ⅛ | ¼ | 1/6 | ⅛ |
|---|---|---|---|---|
| Tearing and opening resisting pressure | | | | |

TABLE 1-continued

| (in kg/cm$^2$) | 40~60 | 30~40 | 25~35 | 10~30 |
|---|---|---|---|---|

Note 1:
The thickness of the metal plate of the battery can used in the test was 0.4 mm as is conventional.
Note 2:
200 units of each of the above mentioned battery cans were tested. The pressure under which the incision was torn and opened was measured to investigate the fluctuation.

From the result of the experiments of the present invention, it has been found that a pressure of 25 to 40 kg/cm$^2$ is optimum as a tearing and opening resisting pressure to insure that the sealed part appropriately resists pressure. A thickness for the thin part in the range of ¼ to 1/6 of the thickness of the metal plate is suitable. Under a pressure above 40 kg/cm$^2$, the sealed part is likely to be opened and, that is to say, the battery container is likely to burst. Below 25 kg/cm$^2$, even when the pressure is not abnormal, the sealed part will be torn. Further, experiments were made with metal plate thicknesses of 0.3 and 0.5 mm. The sealed part resisting pressure and tearing and opening resisting pressure are somewhat different with such thicknesses but are shown to be of the same tendency as in the above table. Also, thicknesses for of the thin part of ¼ to 1/6 of the thickness of the metal plate are excellent.

Figure 3:
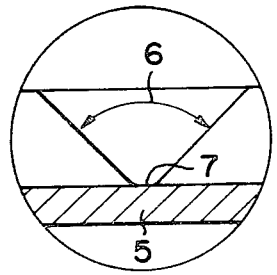
FIG. 3 is a magnified sectioned view showing only a cruciform intersection of another embodiment of the present invention.

However, it has also been found that, even with a thickness for the thin part of ⅓ to ¼ of the thickness of the metal plate, the tearing and opening resisting pressure will be below 40 kg/cm$^2$, depending on the shape of the cruciform incision. That is to say, as shown in FIG. 3, if the V-shaped incision angle 6 is made about 90 degrees and the radius 7 at the V-shaped tip is made 0.1 to 0.2 mm, the incision will be easy to tear. An embodiment is shown as follows:

TABLE 2

| | V-shaped incision angle | Tip radius | Thickness of the thin part (in ratio) | | | |
|---|---|---|---|---|---|---|
| | | | ⅓ | ¼ | 1/6 | ⅛ |
| | | mm | kg/cm$^2$ | kg/cm$^2$ | kg/cm$^2$ | kg/cm$^2$ |
| | 60° | 0.3 | 40~60 | 30~40 | 25~35 | 10~30 |
| | 75° | 0.3 | 35~55 | 25~35 | 20~30 | 10~30 |
| Control | 90° | 0.3 | 35~55 | 25~35 | 20~30 | 10~30 |
| | 60° | 0.2 | 35~55 | 25~35 | 20~30 | 10~30 |
| | 75° | 0.2 | 35~50 | 20~30 | 20~30 | 10~30 |
| Present invention | 90° | 0.2 | 37~40 | 32~37 | 25~32 | 15~25 |
| | 90° | 0.1 | 35~40 | 30~35 | 25~30 | 15~25 |

Note 1:
The thickness of the metal plate of the battery can used in the test was 0.4 mm as usual.
Note 2:
200 units of each of the above mentioned battery cans were tested. The pressure under which the incision was torn and opened was measured to investigate the fluctuation.

The results of these experiments show that, a pressure of 25 to 40 kg/cm$^2$ is the optimum tearing range to insure that the sealed part resists the pressure. According to the present invention, even if the thickness of the thin part under the incision is worked so that its fluctuates in the range of ⅓ to 1/6 of the thickness of the metal plate, a suitable pressure resistance will be obtained.

By the way, the sealed part resisting pressure is generally 60 to 70 kg/cm$^2$. Therefore, with the ⅓ thicknesses in the Control (Table 2), since the sealed part resisting pressure is 40 to 60 kg/cm$^2$, the sealed part is likely to be opened first. However, in the preferred embodiment of the present invention, with a thin part thickness of ⅓, the resisting pressure is always in the range of 35 to 40 kg/cm$^2$ and there is no such fear.

Further, with pressures below 25 kg/cm$^2$, which are not generally abnormal, the incision will be torn. From the results of these experiments, it is found that, when the incision angle is about 90 degrees and the tip radius is 0.1 to 0.2 mm, the incision will be effective and that, even with the same angle of 90 degrees, if the tip radius is 0.3 mm, the expected effect will not be obtained. The wider the allowable range of the tearing and opening resisting pressure (that is, of the thickness of the thin part), the easier the work. Further, experiments were made with metal plate thicknesses of 0.3 and 0.5 mm. The sealed part resisting pressures and tearing and opening resisting pressures are somewhat different but show substantially the same tendencies as in the above table and thicknesses for the thin part of ⅓ to 1/6 of the thickness of the metal plate were excellent. By the way, a metal plate thickness of 0.3 to 0.5 mm was most effective. Needless to say, other thicknesses are also applicable.

Figure 4:
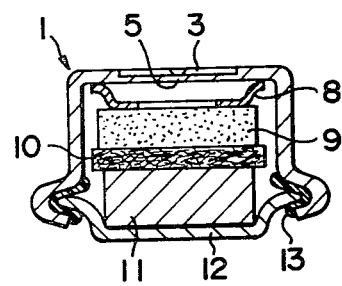
FIG. 4 is a vertically sectioned view of a sealed type battery of an embodiment by the present invention.

Now, the present application invention to a general sealed type battery such as a button type nickel-cadmium alkaline storage battery is in FIG. 4 in which a positive active substance 9 consisting of nickel oxide is secured with a metal spring body 8 disposed on a cruciformly incised wall in a battery can 1. Further a negative active substance 11 of cadmium is arranged through a separator 10 impregnated with an alkaline electrolyte and the components are sealed through a gasket 13 with a battery cover 12. In such case, if the cruciformly incised battery can is arranged as a positive side terminal of the battery, it will serve also to indicate + (positive side). By the way, it is needless to say that the cruciform incision on the battery can may be made on the battery can either on the container side or on the cover side.

That is to say, in the present invention, it is confirmed with experiments that, in order to obtain a practical battery can, it is indispensable not only to reduce the tearing and opening resisting pressure of the incision part to be merely lower than the resisting pressure of the sealed part but also to apply it so as not to be too low and to have the resisting pressure stable in the precision range of the pressing work. Particularly, it is preferable that the tearing and opening resisting pressure does not fluctuate. In this respect, a mere cruciform stamp will tear and open in all parts of it with the rise of the internal pressure and the resisting pressure will greatly fluctuate with the difference of the tearing position, whereas, in the present invention, the internal pressure will be concentrated at the X-shaped intersection of the wedge-shaped tips, the incision will not be substantially torn in any other part than this part and therefore the dimensional precision of any other thin part is not such a problem. The allowable range of fluctuation is so wide as to be ⅓ to 1/6. Therefore, if only the thickness of the thin part of the above mentioned intersection part is controlled to be in a fixed range, a stably operated battery will be able to be made and will be adapted to a continuous work.

While the present invention has been described with reference to particular embodiments thereof, it will be understood that numerous modifications may be made by those skilled in the art without actually departing from the spirit and scope of the invention as defined in the appended claims.

We claim:

1. A sealed button type battery comprising a battery can, a positive active substance, a separator impregnated with an electrolyte, a negative active substance and a battery cover, and wherein a cruciform incision is made on a metal plate forming the battery can, said incision being arranged proximal the positive active substance and being V-shaped in cross-section with an incision angle of about 90° and with a tip radius of from about 0.1 to 0.2 mm so as to form a wedge-shaped, X-shaped tip presenting a thin part at the cruciform intersection, said metal plate being about 0.3 to 0.5 mm thick and the incised thin part being about $\frac{1}{3}$ to 1/6 of the thickness of the metal plate.

2. A sealed button type battery according to claim 1 wherein said cruciformly incised metal plate is a positive terminal.

* * * * *